(12) United States Patent
Oladeji (10) Patent No.: US 9,666,870 B2
(45) Date of Patent: May 30, 2017

(54) COMPOSITE ELECTRODES FOR LITHIUM ION BATTERY AND METHOD OF MAKING

(71) Applicant: QuantumScape Corporation, San Jose, CA (US)

(72) Inventor: Isaiah O. Oladeji, Gotha, FL (US)

(73) Assignee: QuantumScape Corporation, San Jose, CA (US)

( * ) Notice: Subject to any disclaimer, the term of this patent is extended or adjusted under 35 U.S.C. 154(b) by 0 days.

(21) Appl. No.: 13/998,717

(22) Filed: Nov. 26, 2013

(65) Prior Publication Data

US 2014/0170480 A1    Jun. 19, 2014

Related U.S. Application Data

(62) Division of application No. 13/317,963, filed on Nov. 1, 2011, now abandoned.

(51) Int. Cl.
*H01M 4/74* (2006.01)
*H01M 4/13* (2010.01)
(Continued)

(52) U.S. Cl.
CPC ........... *H01M 4/74* (2013.01); *H01M 4/0404* (2013.01); *H01M 4/0435* (2013.01); *H01M 4/0471* (2013.01); *H01M 4/13* (2013.01); *H01M 4/139* (2013.01); *H01M 4/362* (2013.01); *H01M 4/485* (2013.01); *H01M 4/661* (2013.01);
(Continued)

(58) Field of Classification Search
None
See application file for complete search history.

(56) References Cited

U.S. PATENT DOCUMENTS

| 5,298,288 A | 3/1994 | Curry et al. |
|---|---|---|
| 5,856,045 A | 1/1999 | Fauteux et al. |

(Continued)

OTHER PUBLICATIONS

Kitaura, Hirokazu et al., "Fabrication of electrode-electrolyte interfaces in all-solid-state rechargeable lithium batteries by using a supercooled liquid state of the glassy electrolytes", 2011, Journal of Materials Chemistry, vol. 21 (1), pp. 118-124.*

(Continued)

*Primary Examiner* — Barbara Gilliam
*Assistant Examiner* — Angela Martin
(74) *Attorney, Agent, or Firm* — Squire Patton Boggs (US) LLP (57) ABSTRACT

A method for making a composite electrode for a lithium ion battery comprises the steps of: preparing a slurry containing particles of inorganic electrode material(s) suspended in a solvent; preheating a porous metallic substrate; loading the metallic substrate with the slurry; baking the loaded substrate at a first temperature; curing the baked substrate at a second temperature sufficient to form a desired nanocrystalline material within the pores of the substrate; calendaring the cured composite to reduce internal porosity; and, annealing the calendared composite at a third temperature to produce a self-supporting multiphase electrode. Because of the calendaring step, the resulting electrode is self-supporting, has improved current collecting properties, and improved cycling lifetime. Anodes and cathodes made by the process, and batteries using them, are also disclosed.

16 Claims, 10 Drawing Sheets

(51) Int. Cl.
  *H01M 4/485* (2010.01)
  *H01M 4/139* (2010.01)
  *H01M 10/052* (2010.01)
  *H01M 10/0564* (2010.01)
  *H01M 4/04* (2006.01)
  *H01M 4/36* (2006.01)
  *H01M 4/66* (2006.01)

(52) U.S. Cl.
  CPC ..... *H01M 10/052* (2013.01); *H01M 10/0564* (2013.01); *Y02P 70/54* (2015.11)

(56) References Cited

U.S. PATENT DOCUMENTS

| | | | |
|---|---|---|---|
| 6,432,585 B1 | 8/2002 | Kawakami et al. | |
| 7,396,614 B2 | 7/2008 | Jouanneau et al. | |
| 7,608,362 B2 | 10/2009 | Choi et al. | |
| 7,842,420 B2 | 11/2010 | Wixom et al. | |
| 7,892,676 B2 | 2/2011 | Yang et al. | |
| 7,923,154 B2 | 4/2011 | Audemer et al. | |
| 7,939,198 B2 | 5/2011 | Mukherjee et al. | |
| 7,972,899 B2 | 7/2011 | Oladeji | |
| 8,465,556 B2* | 6/2013 | Oladeji | 29/623.1 |
| 8,877,388 B1* | 11/2014 | Ihlefeld et al. | 429/305 |
| 2002/0106447 A1 | 8/2002 | Lindstrom et al. | |
| 2003/0180616 A1* | 9/2003 | Johnson et al. | 429/231.1 |
| 2005/0221163 A1 | 10/2005 | Yang et al. | |
| 2007/0020385 A1 | 1/2007 | Naoi et al. | |
| 2009/0068563 A1* | 3/2009 | Kanda et al. | 429/306 |
| 2009/0092747 A1 | 4/2009 | Zhamu et al. | |
| 2010/0203383 A1* | 8/2010 | Weppner | 429/209 |
| 2011/0168327 A1 | 7/2011 | Oladeji | |
| 2011/0171398 A1 | 7/2011 | Oladeji | |
| 2011/0177398 A1 | 7/2011 | Affinito et al. | |
| 2012/0251822 A1* | 10/2012 | Mao et al. | 428/355 CN |
| 2012/0263987 A1* | 10/2012 | Buckley et al. | 429/94 |
| 2013/0004814 A1* | 1/2013 | Ohashi et al. | 429/94 |
| 2013/0108802 A1 | 5/2013 | Oladeji | |
| 2014/0057182 A1* | 2/2014 | DeJonghe et al. | 429/405 |
| 2014/0170465 A1* | 6/2014 | Visco et al. | 429/144 |

OTHER PUBLICATIONS

Kanamura, Kiyoshi et al., "Three dimensionally ordered composite solid materials for all solid-state rechargeable lithium batteries", Jun. 2005, Journal of Power Sources, vol. 146, pp. 86-89.*

Hayashi et al "All-solid-state rechargeable lithium batteris with $Li_2S$ as a positive electrode material" J. Power Sources 183:422-26 (2008).

McKeen, Laurence. Fluorinated Coatings and Finishes Handbook—The Definitive User's Guide and Databook, 2006, William Andrew Publishing/Plastics Design Library, Chapter 10, p. 135-136.

Parashar, et al., Ethyl silicate binders for high performance coatings, 2001, Progress in Organic Coatings, p. 3, Table 2.

Pierson, H.O. Handbook of Carbon, Graphite, Diamond and Fullerenes—Properties, Processing and Applications, 1993, William Andrew Publishing/Noyes, Chapter 3, Section 5.1, p. 61.

Sakuda et al "All-solid-state lithium secondary batteries using $LiCoO2$ particles with pulsed laser deposition coatings . . . " J. Power Sources 196:6735-41 (2011).

Sakuda et al "Interfacial observation between $LiCoO2$ electrode and LiS-P255 solid electrolytes of all-solid-state batteries . . . " Chem. of Materials 22:949-56 (2010).

Stepina, et al., Ethylene vinylacetate copolymer and nanographite composite as chemical vapour sensor, 2013, Functional Materials and Nanotechnologies, p. 2.

Wang et al "Formulation and characterization of ultra-thick electrodes for high-energy lithium ion batteries . . . " J. Power Sources 196:8714-18 (2011).

* cited by examiner

COMPOSITE ELECTRODES FOR LITHIUM ION BATTERY AND METHOD OF MAKING

CROSS-REFERENCE TO RELATED APPLICATION

This application is a Divisional of U.S. patent application Ser. No. 13/317,963 entitled, "Composite Electrodes for Lithium Ion Battery and Method of Making" filed on Nov. 1, 2011 by the present inventors, and is also related to U.S. patent application Ser. No. 13/317,973 entitled, "Composite Electrodes for Lithium Ion Battery and Method of Making" filed on Nov. 1, 2011 by the present inventors. The entire disclosures of each of the foregoing applications are incorporated herein by reference.

BACKGROUND OF THE INVENTION

Field of the Invention

The invention pertains to methods of making composite electrodes for lithium ion batteries, and more particularly, to methods of fabricating composite cathodes suitable for both liquid cell and all-solid-state cell applications, and batteries containing the same.

Description of Related Art

Electrodes, especially the cathodes, for traditional lithium ion batteries are typically multi-component structures. They include: nanoparticles of the active cathode material for lithium storage; an electron conductor that is either carbon black, carbon nanotube, carbon fiber, or graphene; a binding agent that is an insulating polymer that binds all the nanoparticles to each other and to a substrate; and an ionic conductor that is usually provided by forming the film of the composite of other components deposited on a metallic current collector foil and then soaking in a liquid electrolyte.

The active material nanoparticles as well as the nanoparticles of conductive carbonaceous materials are performed. To improve the cell performance, researchers over the years have worked on size distribution of the nanoparticles, doping of the active material nanoparticles with other elements, and coating the active material nanoparticles with an electronic conductor film or an ionic conductor film. Several of these methods as previously disclosed include:

U.S. Pat. No. 7,608,362 describes a method of producing a composite cathode active material powder comprising at least one large diameter active material selected from the group consisting of metal composite oxides and at least one small diameter active material selected from the group consisting of carbon-based materials and metal oxide compounds. Mixing the large and small diameter active materials in a proper weight ratio improves packing density; and including highly stable materials and highly conductive materials in the composite cathode active materials improves volume density, discharge capacity and high rate discharge capacity. The large diameter active material is selected from the group consisting of compounds $Li_xCo_{1-y}M_yO_{2-\alpha}X_\alpha$ and $Li_xCo_{1-y-z}Ni_yM_zO_{2-\alpha}X_\alpha$, and at least one small diameter active material is selected from the group consisting of compounds represented by $Li_xCo_{1-y-z}Ni_yM_zO_{2-\alpha}X_\alpha$, $Li_xMn_{2-y}M_yO_{4-\alpha}X_\alpha$, and $Li_xCo_{2-y}M_yO_{4-\alpha}X_\alpha$, Where M is selected from the group consisting of Al, Ni, Mn, Cr, Fe, Mg, Sr, V, rare earth elements and mixtures thereof, and X is selected from the group consisting of O, F, S, P, and combinations thereof, and carbon-based material. The carbon-based material may be selected from the group consisting of graphite, hard carbon, carbon black, carbon fiber, carbon nanotubes (CNT) and mixtures thereof.

U.S. Pat. No. 7,842,420 describes a method of fabricating powder of cathode material from a starting mixture which includes a metal, a phosphate ion, and an additive which enhances the transport of lithium ions in the resultant material. The cathode material comprises $Li_xMPO_4$ wherein M is metal such as iron, and x ranges from 0 upwards to approximately 1, and the additive is selected from the group consisting of: V, Nb, Mo, C, and combinations thereof. The additive may function as a nucleating agent which promotes the growth of at least one component of the material. In still other instances, the additive may promote the reduction of a carbon-containing species in the starting mixture so as to generate free carbon, and this free carbon may be at least partially $sp^2$ bonded. In yet other instances, the additive is operative to modify the lattice structure of the material so that the transport of lithium ions through the modified lattice is enhanced in relation to the transport of lithium ions through a corresponding unmodified lattice. The mixture is heated in a reducing environment to produce the material then ball milled to produce the powder. Heating may be carried out in a temperature range of 300-750° C.

U.S. Pat. No. 7,396,614 describes a method of fabricating a composite positive electrode material comprising a non agglomerating lithium vanadium oxide particles, of the form $Li_{1+x}V_3O_8$ in which $0.1 \leq x \leq 0.25$, as active material, a carbon black material which confers electron conduction properties to the electrode, and a mixture of lithium salt and organic binder which confers ionic conduction properties and mechanical properties to the electrode. The composite positive electrode can be prepared by mixing the active material and the carbon black in a solution of the binder and lithium salt in an appropriate solvent and then by evaporating the solvent under hot conditions under a nitrogen atmosphere. The process for the preparation of the active compound consists in reacting at least one Li precursor with at least one vanadium precursor. The lithium precursor can be chosen from lithium oxides such as $Li_2CO_3$, $LiNO_3$, $LiOH$, $LiOH.H_2O$ and $Li_2O$ and organic lithium salts, such as lithium acetylacetonate, lithium acetate, lithium stearate, lithium formate, lithium oxalate, lithium citrate, lithium lactate, lithium tartrate or lithium pyruvate. The vanadium precursor can be chosen from vanadium salts and vanadium oxides such as $\alpha$-$V_2O_5$, $NH_4VO_3$, $V_2O_4$ and $V_2O_3$.

U.S. Pat. No. 7,923,154 describes a method of synthesis of carbon-coated powders having the olivine or NASICON structure. Carbon-coating of the powder particles is necessary to achieve good performances because of the rather poor electronic conductivity of NASICON structures. For the preparation of coated $LiFePO_4$, sources of Li, Fe and phosphate are dissolved in an aqueous solution together with a polycarboxylic acid and a polyhydric alcohol. Upon water evaporation, polyesterification occurs while a mixed precipitate is formed containing Li, Fe and phosphate. The resin-encapsulated mixture is then heat treated at 700° C. in a reducing atmosphere to produce a fine powder consisting of an olivine $LiFePO_4$ phase, coated with conductive carbon. This powder is used as active material in a lithium insertion-type electrode.

U.S. Pat. No. 7,892,676 describes a method of producing a cathode material comprising a composite compound having a formula of $A_{3x}M1_{2y}(PO_4)_3$, and a conductive metal oxide having a formula of $M2_aO_b$, wherein A represents a metal element selected from the group consisting of Groups IA, IIA and IIIA; each of M1 and M2 independently represents a metal element selected from the group consisting of Groups IIA and IIIA, and transition elements. The cathode material is prepared by the following steps: preparing a solution including A ion, M1 ion, and $PO_4^{3-}$; adding M2 salt into the solution; adjusting the pH of the solution so as to form M2 hydroxide and to convert M2 hydroxide into M2 oxide; and heating the solution containing M2 oxide so as to form the cathode material with fine particles of M2 oxide dispersed in an aggregation of particles of $A_{3x}M1_{2y}(PO_4)_3$.

U.S. Pat. No. 7,939,198 describes a method to produce a composite cathode comprising an electroactive sulfur-containing cathode material that comprises a polysulfide moiety of the formula —$S_m$—, wherein m is an integer equal to or greater than 3; and an electroactive transition metal chalcogenide having the formula $M_jY_k(OR)_l$ wherein: M is a transition metal; Y is the same or different at each occurrence and is oxygen, sulfur, or selenium; R is an organic group and is the same or different at each occurrence; j is an integer ranging from 1 to 12; k is a number ranging from 0 to 72; and l is a number ranging from 0 to 72; with the proviso that k and l cannot both be 0. The chalcogenide encapsulates the electroactive sulfur-containing cathode material and retards the transport of anionic reduction products of the electroactive sulfur-containing cathode material. The method relates to the fabrication of a composite cathode by a sol-gel method wherein the electroactive sulfur-containing cathode material, and optionally binders and conductive fillers, are suspended or dispersed in a medium containing a sol (solution) of the desired electroactive transition metal chalcogenide composition; the resulting composition is first converted into a sol-gel (e.g., a gel-like material having a sol-gel structure or a continuous network-like structure) by the addition of a gelling agent, and the resulting sol-gel is further fabricated into a composite cathode.

All the approaches above still require an organic binder to bind the various nanoparticles together among themselves and to the substrate or current collector. The liquid electrolyte that permeates the cathode made up of lithium storage particles, electron conducting particles, the film of insulative organic binder surrounding the particles, and the voids provides lithium ion conduction. Thus the transport of lithium ion from the liquid and the energy storage particles is limited by the surrounding insulative binder film; this leads to local solid electrolyte interface (SEI) layer formation around the particles because of the side reaction taking place between the liquid electrolyte and organic binder film. The continuous adverse change in the properties of this SEI layers limit the performance and the lifetime of the traditional lithium ion cells.

J. S. Wang et al. [Journal of Power Sources 196:8714-18 (2011)], tried to increase the specific energy density of traditional cells. The cell has a cathode consisting of 1.2 mm thick Al foam filled with a slurry composed of 84 wt. % Li(NiCoMn)$_{1/3}$O$_2$ (L333, NCM-01ST-5, Toda Kogyo)+9 wt. % poly(vinylidene fluoride-cohexafluoropropylene) binder (Kynar Flex 2801, Elf Atochem)+3.5 wt. % carbon black (Super P, MMM)+3.5 wt. % synthetic graphite (KS6, Timcal); an anode, made using 1.2 mm thick Cu foam filled with the slurry of 93 wt % active carbon material (SG, Superior Graphite, SLC 1520), 3 wt. % carbon black (Super P), and 4 wt. % SBR binder (an aqueous styrene-butadiene rubber binder, LHB-108P). The best performance of 10 mAh/cm$^2$ was obtained only at low C rate C/50. A rapid fade was observed at C rate as low as C/20. The energy density of the cell is low because of thick electrodes, also the fundamental low cycle life affecting the traditional cell due to SEI layer has not been addressed by this approach.

In recent years, attempts have been made in making binder free and liquid electrolyte free cathodes in cells as reported by the following:

Hayashi, et al. [Journal of Power Sources 183:422-26 (2008)] constructed a laboratory-scale solid-state cell consisting of the composite cathode powder obtained by mixing Li$_2$S—Cu materials, the lithium ion conductor 80Li$_2$S.20P$_2$S$_5$ glass-ceramic, and electronic conductor acetylene-black with the weight ratio of 38:57:5. The composite powder (10 mg) as a cathode, and the 80Li$_2$S.20P$_2$S$_5$ glass-ceramic powder (80 mg) as a solid electrolyte were placed in a polycarbonate tube (with a diameter of 10 mm) and pressed together under 3700 kg/cm$^2$, and then an Indium foil as a negative electrode was pressed under 1200 kg/cm$^2$ on the pellet. After releasing the pressure, the obtained pellet was sandwiched by two stainless-steel rods as current collectors. The cells were charged and discharged at room temperature in an Ar atmosphere using a charge-discharge measuring device (BTS-2004, Nagano). The constant current density of 64 μA/cm$^2$ was used for charging and discharging with the maximum discharge capacity of 490 mA-h/g.

Sakuda et al. [Chem. Mater., Vol. 22, No. 3, 2010] constructed all-solid-state cells as follows. Mixing Li$_2$SiO$_3$ coated LiCoO$_2$ and the 80Li$_2$S$_3$-20P$_2$S$_5$ glass-ceramic electrolyte with a weight ratio of 70:30 using an agate mortar to prepare composite positive electrodes. A bilayer pellet consisting of the composite positive electrode (10 mg) and glass-ceramic solid electrolytes (80 mg) was obtained by pressing under 360 MPa in a 10 mm diameter tube; indium foil was then attached to the bilayer pellet by pressing under 240 MPa. The pellet was pressed using two stainless steel rods; the stainless steel rods were used as current collectors for both positive and negative electrodes. All the processes for preparation of solid electrolytes and fabrication of all-solid-state batteries were performed in a dry Ar-filled glovebox ([H$_2$O]<1 ppm). A discharge capacity of 60 mAh/g was obtained at a discharge current density of 64 μA/cm$^2$ at 30° C.

Also, Sakuda et al. [Journal of Power Sources 196:6735-41 (2011)]; using the same cell construct described above, used LiCoO$_2$ composite cathode, where LiCoO$_2$ was coated with LiNbO$_3$ then 80Li$_2$S$_3$-20P$_2$S$_5$ films; these particles where then mixed with 80Li$_2$S$_3$-20P$_2$S$_5$ particles to form the composite cathode. The resulting best cell was charged/discharged at the current density of 0.13 mA/cm$^2$ and gave a discharge capacity of 95 mA-h/g.

Importantly, the LiCoO$_2$ particle coating was done with Pulse Laser Deposition (PLD), a process that is relatively unsuitable for routine manufacturing. And all the solid state cells were made by pressing the stack of powder of various components into small area cylindrical disk, a cell fabrication technique that is not readily scalable. The mechanical contact between the particles that dependent on pressing pressure provides less than ideal electrical contact between various particles. The latter combined with too thick solid state electrolyte layer in the cell leads to undesirable overall cell impedance that limits the extractable capacity.

What is needed, therefore, is a scalable, efficient process for making composite cathodes for lithium ion batteries that is suitable for use in both liquid cell and all-solid-state cell applications.

Objects and Advantages

Objects of the present invention include the following: providing an improved composite electrode for lithium ion batteries; providing a composite cathode for alkali ion batteries; providing a composite cathode suitable for both liquid cell and all solid state metal ion batteries; providing an improved alkali ion battery; providing methods for fabricating composite electrodes for metal ion batteries; and providing a scalable, manufacturable process for making composite electrodes and batteries containing them. These and other objects and advantages of the invention will become apparent from consideration of the following specification, read in conjunction with the drawings.

SUMMARY OF THE INVENTION

According to one aspect of the invention, a method for making a composite electrode for a lithium ion battery comprises the steps of:

preparing a slurry containing particles of a selected inorganic electrode material suspended in a selected solvent;

preheating a porous metallic substrate;

loading the preheated metallic substrate with the slurry;

baking the loaded substrate at a first selected temperature;

curing the baked substrate at a second selected temperature sufficient to form a desired nanocrystalline material within the pores of the substrate;

calendaring the cured composite to reduce internal porosity; and, annealing the calendared composite at a third temperature greater than the second temperature to produce a self-supporting multiphase electrode.

According to another aspect of the invention, a cathode for a lithium ion battery comprises:

a first phase comprising an inorganic energy storage material;

a second phase comprising a solid state lithium ion conductor; and, a third phase comprising a reticulated metal structure, interspersed throughout the first and second phases, the reticulated metal forming a structural reinforcement and a current collector, wherein the metal structure comprises from 5 to 25% of the volume of material, the first and second phases together comprise from 75 to 95% of the volume of the material, and the cathode contains no more than 30 vol. % porosity.

According to another aspect of the invention, an anode for a lithium ion battery comprises:

a first phase comprising a lithium ion storage material;

a second phase comprising a solid state lithium ion conductor; and, a third phase comprising a reticulated metal structure, interspersed throughout the first and second phases, the reticulated metal forming a structural reinforcement and a current collector, wherein the metal structure comprises from 5 to 25% of the volume of material, the first and second phases together comprise from 75 to 95% of the volume of the material, and the anode contains no more than 30 vol. % porosity.

According to another aspect of the invention lithium ion battery comprises:

a cathode comprising:
 a first phase comprising an inorganic energy storage material;
 a second phase comprising a solid state lithium ion conductor; and,
 a third phase comprising a reticulated metal structure, interspersed throughout the first and second phases, the reticulated metal forming a structural reinforcement and a current collector,
 wherein the metal structure comprises from 5 to 25% of the volume of material, the first and second phases together comprise from 75 to 95% of the volume of the material, and the cathode contains no more than 30 vol. % porosity;

an anode comprising a lithium storage material; and, a lithium-conducting electrolyte separating the cathode from the anode.

According to another aspect of the invention, a lithium ion battery comprises:

an anode comprising:
 a first phase comprising a lithium ion storage material;
 a second phase comprising a solid state lithium ion conductor; and,
 a third phase comprising a reticulated metal structure, interspersed throughout the first and second phases, the reticulated metal forming a structural reinforcement and a current collector,
 wherein the metal structure comprises from 5 to 25% of the volume of material, the first and second phases together comprise from 75 to 95% of the volume of the material, and the anode contains no more than 30 vol. % porosity;

a cathode comprising an energy storage material; and, a lithium-conducting electrolyte separating the cathode from the anode.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

The invention includes an industrially scalable method of fabricating a composite cathode suitable for both liquid cell and all-solid-state cell applications. The cathode consists of inorganic nanoparticles for energy storage, lithium ion conduction, and electron conduction in a metallic foam framework, which acts as a current collector and a supplementary electron conducting path, and bound together by a lithium ion conducting inorganic film.

The fabrication of multiphase electrodes may be generally summarized as follows:

Preparing the precursor sol that consists of energy storage material nuclei (first phase), the gelling agent that also act as nano-particles capping material, binder, and lithium ion conductor (second phase-A).

Adding to this slurry preformed nanoparticles of complementary lithium ion conductor (second phase-B); then adding preformed nano-particles of complementary electron conductor (third phase-B). The final precursor slurry is then formed by sonicating the mixed materials for complete homogenization.

Heated metallic foam is then populated with the final precursor slurry using any of various gel coating techniques, preferably "gel phase spray process for electroless electrochemical deposition" (GELSPEED). After baking, curing, calendaring, and final temperature anneal, the metallic foam acts as a three-dimensional support for the electrode material nanoparticles and other supporting phases, and as a stress suppressor, electron conductor, and current collector (third phase-A).

The precursor solvent is preferably deionized water. The energy storage material reagents are preferably water soluble metallic salts of Co, Ni, Mn, Fe, Al, Li, Cu, Mo, etc. as the metal ion source; urea, or thiourea as ligand and oxygen or sulfur source; phosphoric acid as the source of phosphorus; and nitric acid, sulfuric acid, triethanolamine, acetic acid, or citric acid as additional ligand. The lithium metal oxide, sulfide, or phosphate, or the metal oxide, or sulfide may also be used instead of soluble metallic salt. These reagents are dissolved in deionized water and heated at temperature ranging between 80 to 100° C. to form the nuclei of the energy storage material. The nuclei are typically about 10 nm to 5 μm in diameter. Lithium polysilicate solution, $(Li_2O)_x(SiO_2)_y$, where x/y is 1 to 10, is then added to the energy storage nuclei sol as a capping phase to arrest further crystal growth and transform the solution into a more gelatinous slurry. The lithium polysilicate phase typically amounts to about 1 to 10% of the electrolyte material. Preformed nanoparticles of a lithium ion conductor such as $Li_2WO_4$, $Li_{1.3}Al_{0.3}Ti_{1.7}(PO_4)_3$, $Li_3PO_4$, $Li_2MoO_4$, or $Li_6La_3Zr_2O_{12}$ are added to the gel. Preformed nanoparticles of an electronic conductor like carbon nanotubes, $TiO_x$, nickel, tungsten, tin, Cu, or CuO, etc., are also added to the gel. These particles are preferably 10 to 100 nm in size and amount to about 1 to 30 wt. % of the electrode material. This mixture is then sonicated at 5 kHz to 1 MHz for about 5 to 20 minutes to form a homogeneous slurry with viscosity ranging from 100 to 10,000 cP. (It will be appreciated that the slurry is non-Newtonian, and further that the slurry will become more gel-like over time as the lithium polysilicate continues to polymerize, so the prepared slurry is preferably used promptly upon completion of the sonication step.) Heated metallic foam such as Ni foam, stainless steel foam, Cu foam, or aluminum foam, etc, is then populated with the slurry (typically dispensed at about 15 to 30° C.) using GELSPEED. The resulting solidified gel in the metallic foam is then baked at a temperature ranging between 100 to 200° C. This is followed by curing at temperature ranging between 250 to 400° C. to transform the energy storage material nuclei into nanoparticles. The new structure is then calendared to form a thick, 3-D electrode consisting of energy storage nanoparticles, lithium ion conducting nanoparticles, electronic conducting nanoparticles, with lithium polysilicate binding the nanoparticles to each other and to the metallic foam. Applicants have discovered, surprisingly, that in the inventive structure the metallic foam serves as an effective structural electrode support, electronic conductor, and current collector. The 3-D electrode is then annealed at temperature ranging between 300 to 800° C. so that the energy storage nanoparticles can form the desired material phase necessary for optimum lithium ion intercalation.

Figure 1:
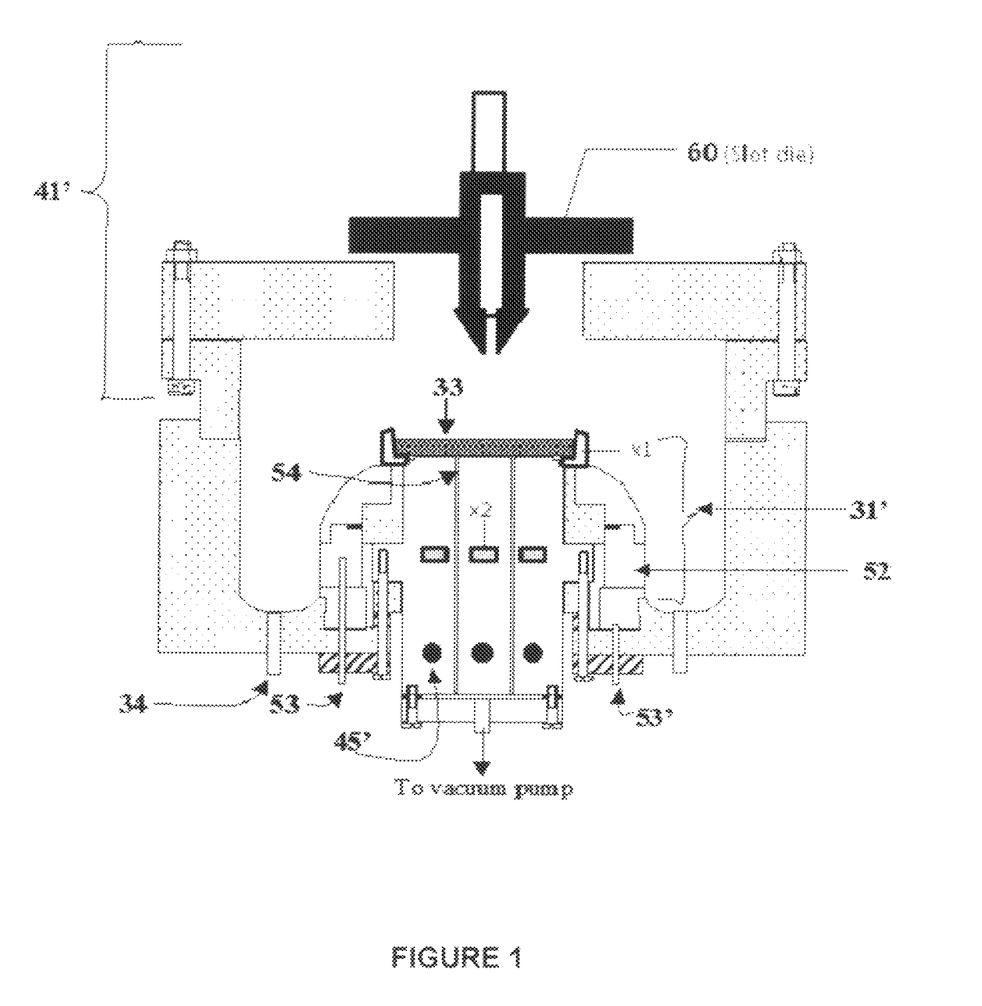
FIG. 1 illustrates schematically a vertical section of a GELSPEED deposition chamber in accordance with one aspect of the present invention.

The GELSPEED process of the present invention is a variation of VPSPEED described in Applicant's U.S. Pat. No. 7,972,899, the entire disclosure of which is incorporated herein by reference. For the GELSPEED process, the nebulizer of the shower is replaced with a slot die. The slot die allows the dispensing of viscous fluids and slurries, which yields a much higher growth rate (typically more than 50 μm/minute). FIG. 1 illustrates a vertical section of a GELSPEED chamber 10 that includes a substrate holder assembly 31' to secure substrate (workpiece) 33 and a showerhead 41' for supplying and distributing processing solution over substrate 33. The substrate holder assembly 31' has two substrate chucking mechanisms: the one provided by the vacuum orifices 54, and the other provided by the magnetic pellet X2. It is contemplated that in many cases the metallic foam substrate is magnetic; at the onset of the deposition the X2 is used to chuck the substrate as the vacuum cannot be used to secure a porous substrate. Once the foam is loaded and the deposited material is cured, the vacuum chuck is turned on to hold down the substrate and to help pull a fresh gel coating solution into available pores of the coated substrate. The ring structure X1 is used to impound the fluid and to provide the seal when the vacuum chuck is activated. The showerhead assembly 41' includes a slot die 60, which is preferably movable to some degree, configured to deliver a viscous reagent gel to substrate 33. The slot die may be of various designs. One suitable type is that manufactured by Innovative Machine Corporation. The width of the slot size is about the size of the substrate to be coated. The coating uniformity is determined by the fluid delivery pressure (typically 1 to 50 psi) and the slot die opening (0.0005" to 0.005"). The system comes with a controller that controls the deposition cycles, the temperature of the substrate holder during the deposition (100 to 150° C.), baking (100 to 200° C.), and curing (150 to 250° C.). Bake and cure times are preferably in the range of 1 to 30 minutes and 5 to 30 minutes, respectively. Additional curing at temperatures higher than 250° C. is carried out ex-situ. The chamber may further include a drain line 34 which is part of the return subsystem that directs partially spent processing solution from the chamber 10 to a reservoir (not shown). 45' is the heat cartridge, the source of heat in the substrate holder assembly 31'. 52 is the cooling jacket with 53 as the coolant liquid inlet and 53' coolant liquid outlet.

Figure 2A:
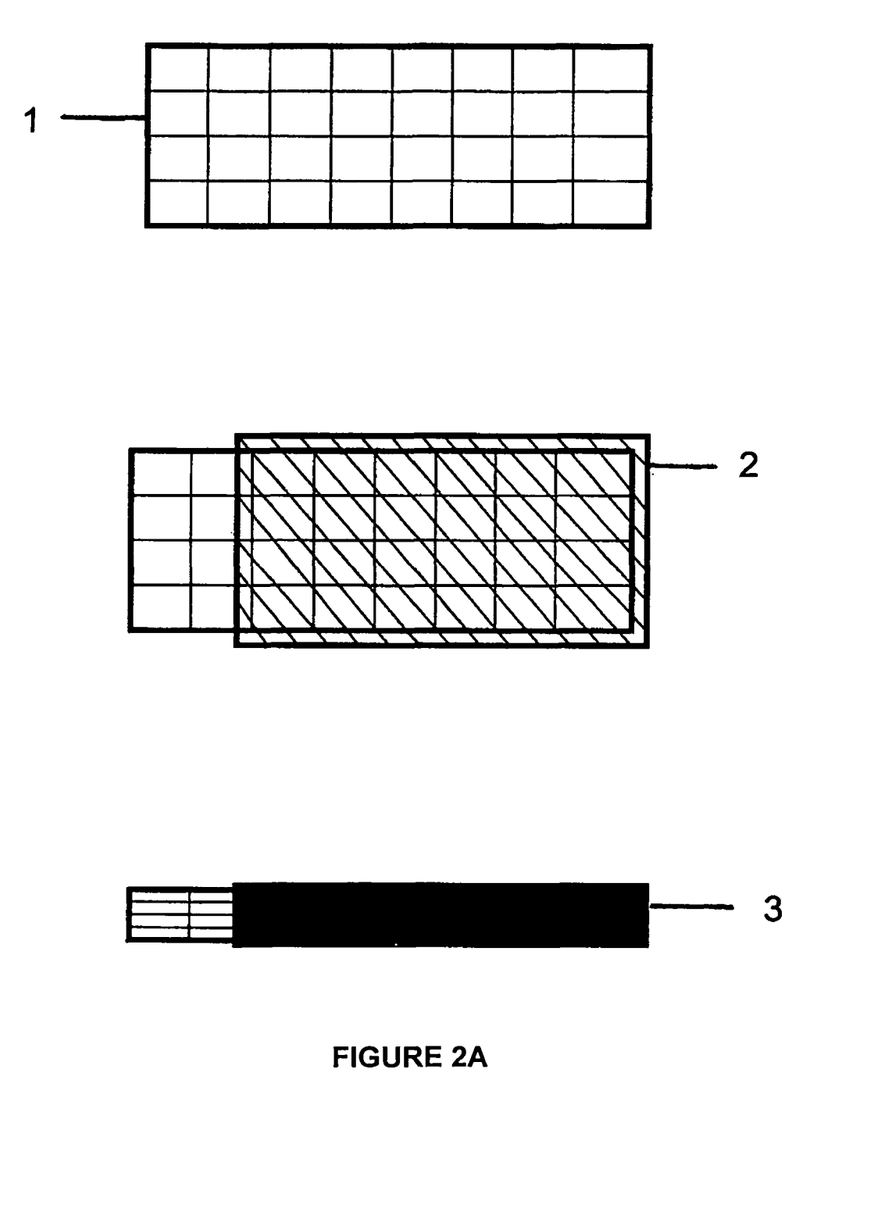
FIG. 2A illustrates the steps for fabricating a composite electrode in accordance with one aspect of the invention.

Process steps to fabricate a composite electrode are illustrated generally in FIG. 2. Beginning with a heated metallic foam preform (top), a portion of the foam is loaded with electrode materials in the form of a gel (center). After heat treatment, calendaring, and annealing, the composite electrode, supported by the metallic foam, is formed (bottom). The calendaring step compresses the composite so the final electrode is thinner and denser, as indicated schematically in the drawing. The Examples that follow will illustrate the use of the invention to make various composite structures and compositions. Those skilled in the art may easily modify the process recipes through routine experimentation in order to create electrodes for particular applications.

EXAMPLE 1

Figure 2B:
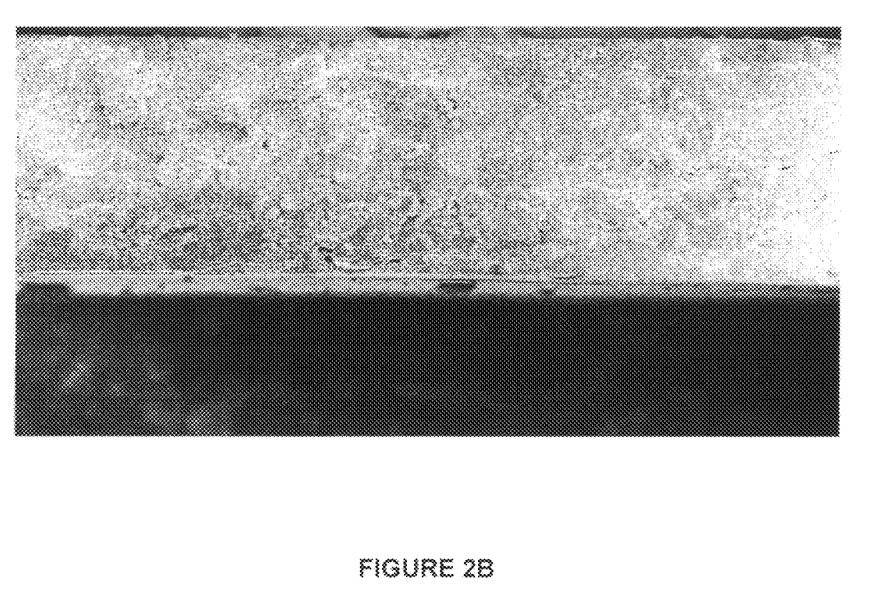
FIG. 2B illustrates a cross-sectional SEM image of a self supporting composite $LiCoO_2$:Al cathode in accordance with one aspect of the invention.

To form a $LiCoO_2$:Al composite cathode, 9.0 g cobalt nitrate, 3 g urea, 1.0 g $Al(NO_3)_3$, and 3.0 g $Li(NO_3)$ were dissolved in 50 ml of de-ionized water and heated until the CoAlLi[complex]O nuclei is formed and the hot solution is 20 ml. 5 ml of 1M citric acid was then added. This was followed by 1 ml of 40 wt. % lithium polysilicate in deionized water. The mixture was then sonicated to form a gel. Then, 0.3 g of $Li_{1.3}Al_{0.3}Ti_{1.7}(PO_4)_3$ and 0.3 g of $TiO_x$ nanoparticles were added for improved ionic conductivity and electronic conductivity respectively. The gel was then resonicated to homogenize the gel. The GELSPEED process was then used to populate a 3"×3" Ni foam substrate 1 heated at 150° C. The coated foam 2 was cured at 250° C. for about 5 minutes. Coating and curing were repeated 2 more times. Additional curing was done in a box furnace at 300° C. for 10 minutes. This was followed by calendaring under a 100 ton press to compact and densify the self supporting composite $LiCoO_2$:Al cathode 3. Estimated pressure applied to the composite was 500 to 5000 kg/cm². The formed structure was then annealed in Argon at 500° C. for 10 minutes to complete the process. A cross-sectional SEM image of a self supporting composite $LiCoO_2$:Al cathode is shown in FIG. 2B. Note that comparable results can also be obtained by replacing cobalt nitrate in the formulation with 3 g $LiCoO_2$ nanoparticles, while reducing the $LiNO_3$ to 0.1 g, and urea to 0.3 g.

EXAMPLE 2

To form a CuS composite cathode, 5 g copper nitrate, 5 g thiourea, and 4 ml hydrazine monohydrate were dissolved in 50 ml de-ionized water and heated until the Cu[complex]S nuclei was formed and the hot solution was 20 ml. 4 ml of 1M acetic acid was then added. This was followed by 1 ml of 40 wt. % lithium polysilicate in deionized water. The mixture was then sonicated to form a gel. Then, 0.3 g $Li_{1.3}Al_{0.3}Ti_{1.7}(PO_4)_3$ and 0.3 g TiOx nanoparticles were added for improved ionic conductivity and electronic conductivity respectively. The gel was then resonicated to homogenize the gel. The GELSPEED process was then used to populate a 3"×3" Ni foam substrate heated at 150° C. The coated foam was cured at 200° C. for about 5 minutes. Coating and curing were repeated 2 more times. Additional curing was done in the tube furnace at 300° C. for 10 minutes in sulfur ambient. This was followed by calendaring under a 100 ton press to compact and densify the self supporting composite CuS cathode. The formed structure was then annealed in sulfur at 400° C. for 10 minutes to complete the process.

EXAMPLE 3

To prepare a SnO composite anode, 5 g tin ethoxide, 0.4 g urea, 0.5 g $Al(NO_3)_3$, and 0.3 g $Li(NO_3)$ were dissolved in 50 ml of de-ionized water and heated until the SnAlLi[complex]O nuclei was formed and the hot solution is 20 ml. 4 ml of 1M acetic acid was then added. This was followed by 1 ml of 40 wt. % lithium polysilicate in deionized water. The mixture was then sonicated to form a gel. Then, 0.3 g $Li_{1.3}Al_{0.3}Ti_{1.7}(PO_4)_3$ and 0.3 g $TiO_x$ nanoparticles were added for improved ionic conductivity and electronic conductivity respectively. The gel was then resonicated to homogenize the gel. The GELSPEED process was then used to populate a 3"×3" Ni foam substrate heated at 150° C. The coated foam was cured at 250° C. for about 5 minutes. Coating and curing were repeated 2 more times. Additional curing was done in a box furnace at 300° C. for 10 minutes. This was followed by calendaring under a 100 ton press to compact and densify the self supporting composite SnO anode. The formed structure was then annealed in argon at 500° C. for 10 minutes to complete the process.

In addition to the exemplary compositions in the preceding examples, other electrode compositions and reagents may easily be substituted according to the inventive method. The list of other cathodes includes $LiMn_yO_x$, where x is 2 or 4 and y is 1 or 2; $LiFePO_4$; $LiMnPO_4$; $LiMn_{(1-x)}Fe_xPO_4$; $LiNiO_2$; $LiMn_{(1-x-y-z)}Ni_xCo_yAl_zO_2$; TiS; MoS; FeS, and CuMS, where M is Fe, Zn, Sn, Ti, or Mo. The list of other anodes includes $SnO_x$; $SnS_x$; $Li_4Ti_5O_{12}$; $LiC_x$; $MnO_x$; and $CoO_x$. The precursors of the constituting elements of these compounds are any water soluble compounds of these elements. The precursors may alternatively be non water soluble nanoparticles of these compounds. Preferred ligands are urea for the oxides, thiourea for the sulfides, and phosphoric acid for the phosphates. Other complimentary ligands include acetic acid, citric acid, oxalic acid, nitric acid, triethanolamine, and hydrazine. The lithium ion and electronic conducting additives include $Li_2WO_4$, $Li_{1.3}Al_{0.3}Ti_{1.7}(PO_4)_3$, Ohara Glass®, $LiAlGaPO_4$, $Li_{7-x}La_3(Zr_{2-x}Nb_x)O_{12}$, LiLaTiO, LiLaZrO, $Ti_4O_7$ (Ebonex® ceramic), $Li_2WO_4$, $Li_2MoO_4$ carbon nanotube, carbon nanowire, carbon nanoparticles, semiconductor nanowire, semiconductor nanoparticles, metal nanowire, metal nano-particles and ceramic nano-particles.

Some specific electrode materials include the following:
$LiMn_{2-x}M1_xO_4$ where M1 is selected from the group comprising Al, Sn, Zn, and Fe, and $0 \leq x \leq 0.05$;
$LiCo_{1-x}M2_xO_2$ where M2 is selected from the group comprising Ni and Al, and $0 \leq x \leq 0.05$;
$LiNi_{1-x}M3_xO_2$ where M3 is selected from the group comprising Co and Al, and $0 \leq x \leq 0.05$;
$LiMn_xNi_yCo_zAl_tO_2$ where $x+y+z+t=1$, and $0 \leq (x, y, z,$ and $t) \leq 1$;
$LiM4PO_4$, where M4 is selected from the group comprising Fe, Co, Ni, and Mn;
CuS, or CuM5S where M5 is selected from the group comprising Fe, Sn, Mo, and Zn;
$LiFePO_4$; $Li_4Ti_5O_{12}$; FeS; and MoS.

It will be understood by those skilled in the art that the atmosphere used in the various heat treatments, particularly the final high-temperature anneal, will be dictated by the type of electrode being formed and therefore may be oxidizing, reducing, or inert. Oxidizing atmospheres may include air or oxygen at a selected pressure, whereas reducing atmospheres may include hydrogen, natural gas, carbon monoxide, methane, etc. Inert atmospheres include nitrogen and argon.

Figure 3:
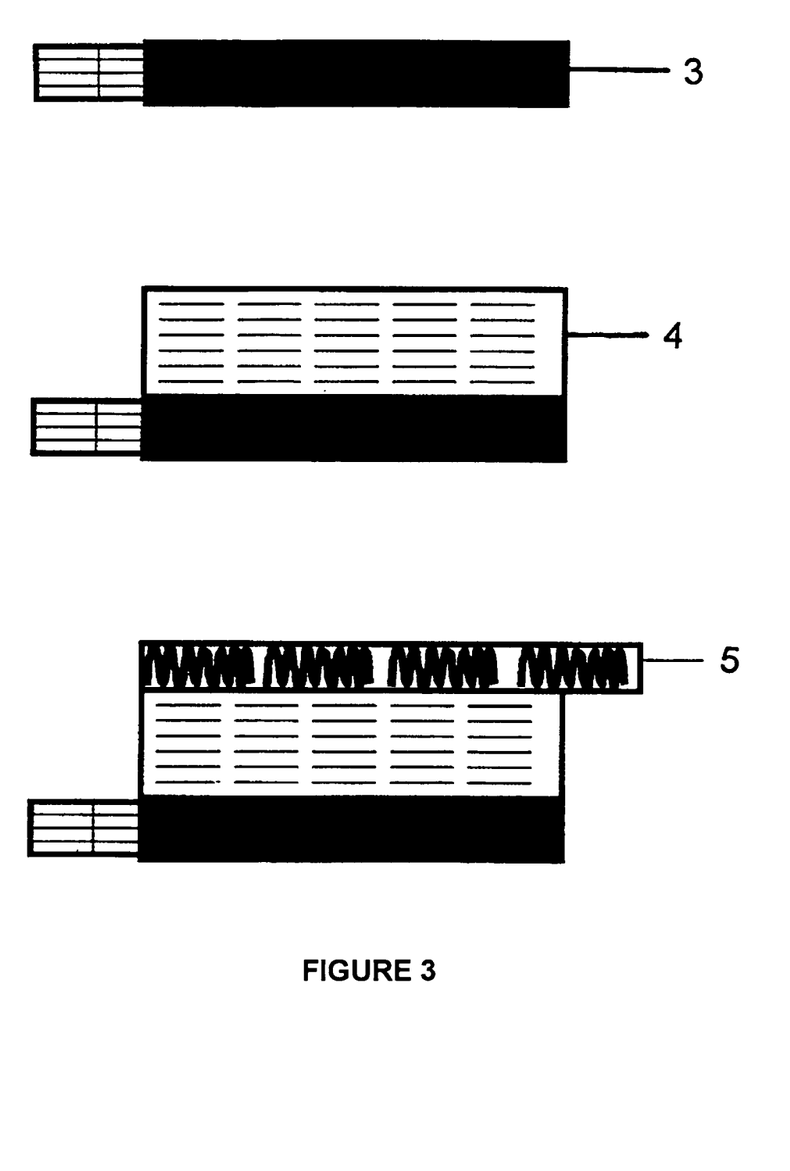
FIG. 3 illustrates the steps for fabricating a solid state Li ion cell using a self supporting composite electrode in accordance with another aspect of the invention.

Process steps to fabricate an inorganic solid state lithium ion cell using the self supporting composite cathode are illustrated generally in FIG. 3. Beginning with a self supporting cathode made according to the process shown in FIG. 2, a high alkali metal (preferably lithium) ion conducting solid state electrolyte [for example, $Li_yAl_{(1-x)}Ga_xS(PO_4)$] is deposited as a layer by VPSPEED or other suitable process. The Li anode and current collector is then deposited on top of the electrolyte by evaporation or other suitable method, thereby forming a Li cell (bottom).

EXAMPLE 4

To fabricate a $LiCoO_2$:Al solid state cell, the self supporting composite $LiCoO_2$:Al cathode 3 as prepared in Example 1 was used. About 4 μm thick $Li_yAl_{(1-x)}Ga_xS(PO_4)$ solid state electrolyte 4 was then deposited and processed on the cathode 3 as described in Applicant's U.S. Pat. Appl. Pub. 2011/0168327, the entire disclosure of which is incorporated herein by reference. This was followed by the deposition of 2 μm thick Li 5 by Field-Assisted VPSPEED (FAVPSPEED), described in detail in Applicant's U.S. Pat. Appl. Pub. 2011/0171398, the entire disclosure of which is incorporated herein by reference. (It may alternatively be deposited using a traditional vacuum technique.) 50 μm thick Li foil was then hot laminated onto the 2 μm deposited Li for current collection to complete the cell.

Figure 4:
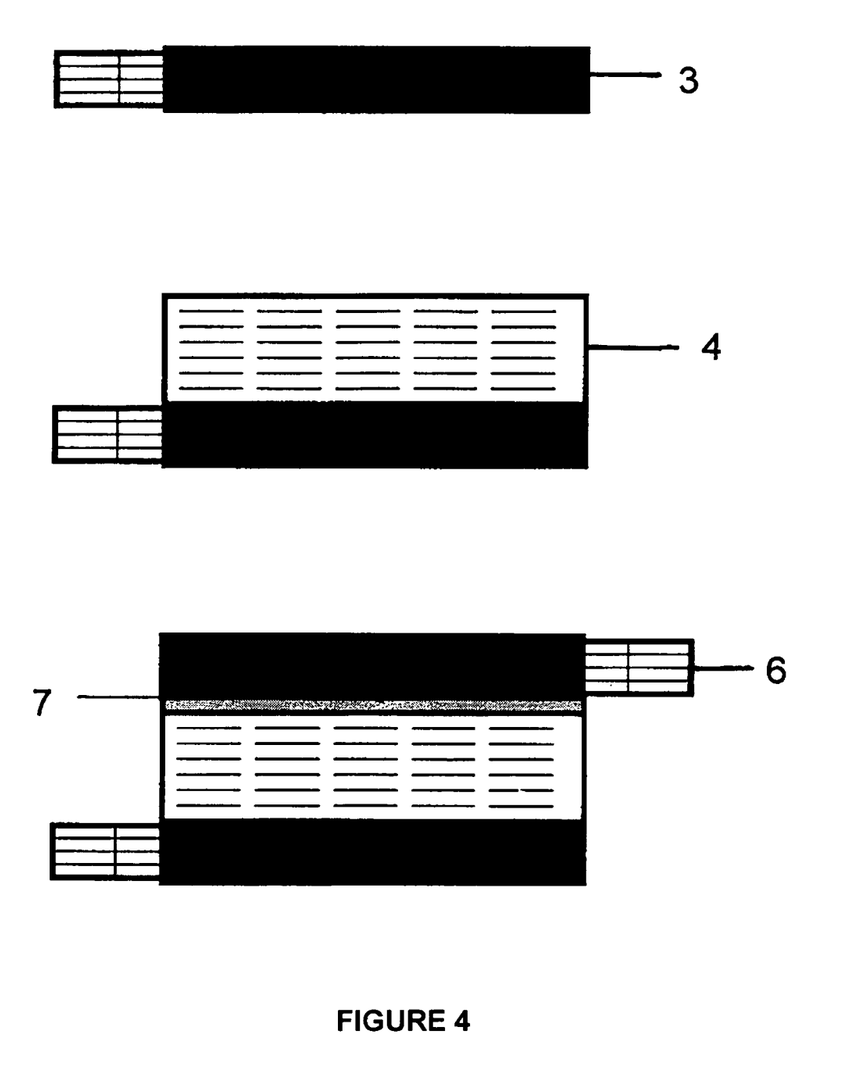
FIG. 4 illustrates the steps for fabricating a solid state Li ion cell using self supporting composite anode and cathode in accordance with another aspect of the invention.

Process steps to fabricate an inorganic solid state lithium ion cell using both a self supporting composite cathode and a self supporting composite anode are illustrated generally in FIG. 4. Beginning with a self supporting cathode 3 (top) made according to the process shown in FIG. 2, a solid state electrolyte 4 [for example, $Li_yAl_{(1-x)}Ga_xS(PO_4)$] is deposited as a layer by VPSPEED or other suitable process (center). A self supporting composite anode and current collector 6 is then attached to the electrolyte using lithium ion conducting glue 7, thereby forming a Li cell (bottom).

EXAMPLE 5

Both composite self supporting $LiCoO_2$:Al cathode and $Li_yAl_{(1-x)}Ga_xS(PO_4)$ solid state electrolyte are deposited and processed as described in EXAMPLE 4. A 5 μm thick lithium ion conducting glue consisting of 6 g polyvinylidene fluoride (PVDF) dissolved in 40 g dimethoxyethane (DME) solvent, 15 g 2M 3M™ Fluorad™ (lithium (bis)trifluoromethanesulfonimide) dissolved in Tetrahydrofuran (THF), with 4 g Ohara glass nano-particles is then spray deposited by VPSPEED on the solid state electrolyte. The self supporting SnO anode of EXAMPLE 3 is then hot pressed on the glue at 120° C. to complete the cell fabrication.

Figure 5:
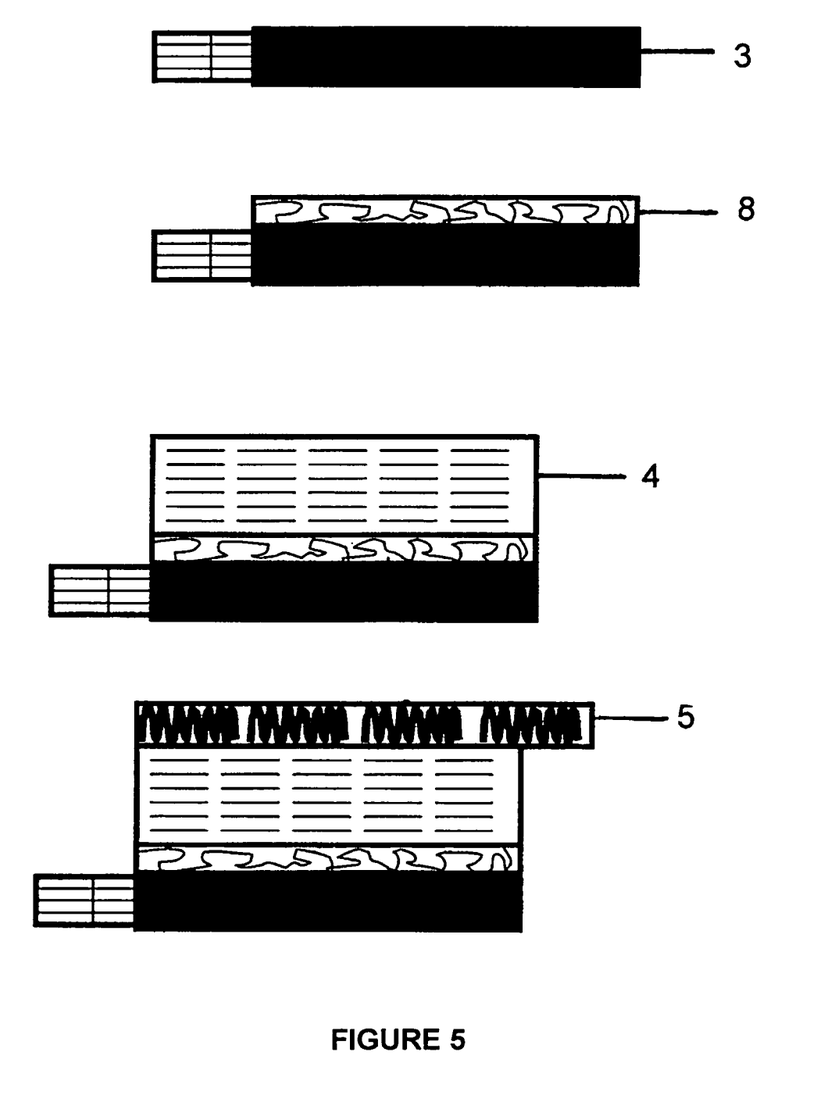
FIG. 5 illustrates the steps for fabricating a solid state Li ion cell using a self supporting composite cathode with a buffer layer in accordance with another aspect of the invention.

Process steps to fabricate an inorganic solid state lithium ion cell using a self supporting composite cathode with a buffer layer are illustrated generally in FIG. 5. Beginning with a self supporting cathode 3 (top) made according to the process shown in FIG. 2, a buffer layer 8 (for example, $LiNbO_3$) is deposited by VPSPEED on the cathode. This buffer layer serves to reduce the internal resistance of the cell caused by lattice mismatch and built in field between cathode and electrolyte. Next, a solid state electrolyte 4 [for example, $Li_yAl_{(1-x)}Ga_xS(PO_4)$] is deposited as a layer by VPSPEED or other suitable process. The Li anode and current collector 5 is then deposited on top of the electrolyte by evaporation or other suitable method, thereby forming a Li cell (bottom).

EXAMPLE 6

The $LiCoO_2$:Al solid cell with a buffer layer construct is same as that of EXAMPLE 4; except that a 0.05 μm thick $LiNbO_3$ is deposited on $LiCoO_2$:Al as a buffer layer before the deposition of $Li_yAl_{(1-x)}Ga_xS(PO_4)$ solid state electrolyte. The aqueous solution of $LiNbO_3$ consisting of lithium nitrate 0.1M, niobium nitrate 0.1M, urea 0.2M, nitric acid 0.05M, and 5% volume alcohol is spray deposited by VPSPEED at 250° C., followed by annealing in Ar at 500° C. for about 10 minutes.

Those skilled in the art will appreciate that other materials may be suitable for the buffer layer in particular applications. Some suitable materials include: $LiNbO_3$, $Li_xSiO_y$, $Li$-$\beta Al_2O_3$, $Li_xAlSiO_y$, $Li_{1.3}Al_{0.3}Ti_{1.7}(PO_4)_3$, $Li_{7-x}La_3(Zr_{2-x}Nb_x)O_{12}$, $Li_yAl_{(1-x)}Ga_xS(PO_4)$, $Li_{0.35}La_{0.55}TiO_3$, and $LiTi_2(PO_4)_3$.

Figure 6:
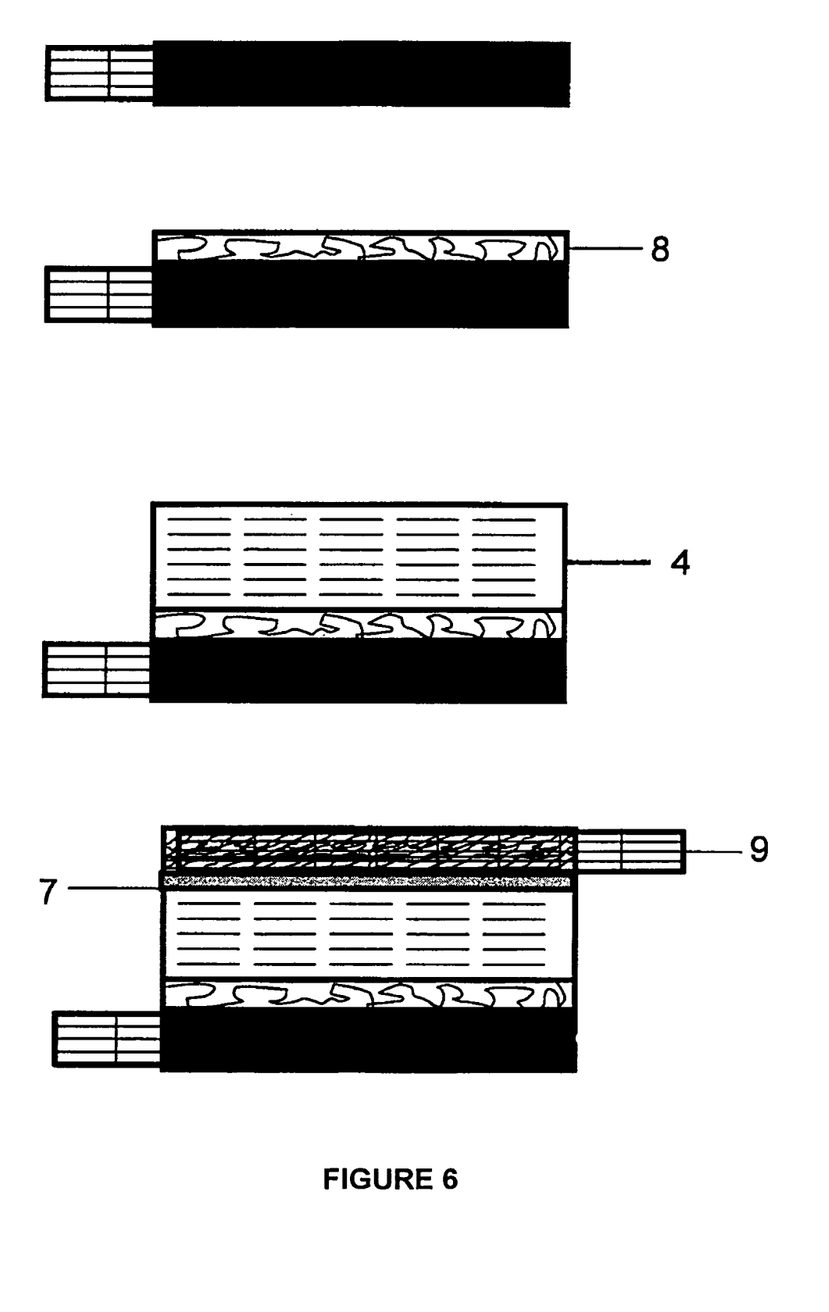
FIG. 6 illustrates the steps for fabricating a solid state Li ion cell using self supporting composite anode and cathode with a buffer layer in accordance with another aspect of the invention.

Process steps to fabricate an inorganic solid state lithium ion cell using both a self supporting composite cathode and a self supporting composite anode, and a buffer layer are illustrated generally in FIG. 6. Beginning with a self supporting cathode (top) made according to the process shown in FIG. 2, a buffer layer (e.g., $LiNbO_3$) is deposited on the cathode as described in EXAMPLE 6. Again, this buffer layer serves to reduce the internal resistance of the cell caused by lattice mismatch and built in field between cathode and electrolyte. A solid state electrolyte [for example, $Li_yAl_{(1-x)}Ga_xS(PO_4)$] is deposited on top of the buffer layer by VPSPEED or other suitable process. A self supporting composite anode and current collector is then attached to the electrolyte using lithium ion conducting glue, thereby forming a Li cell (bottom).

EXAMPLE 7

The $LiCoO_2$:Al solid cell with a buffer layer construct is the same as that of EXAMPLE 6. Next a lithium ion conducting glue layer described in EXAMPLE 5 is deposited on the solid electrolyte. The self supporting SnO anode of EXAMPLE 3 is then hot pressed on the glue at 120° C. to complete the cell fabrication.

Figure 7A:
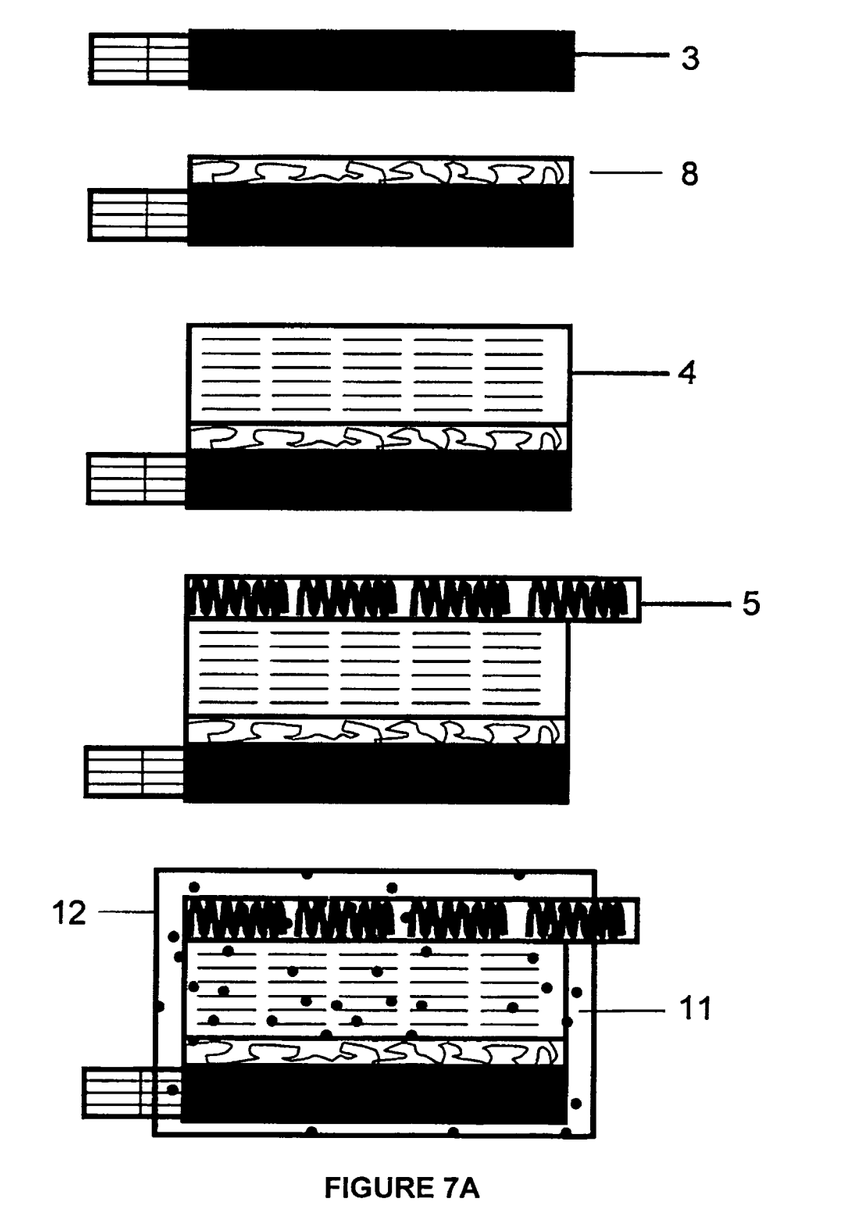
FIG. 7A illustrates the steps for fabricating a hybrid cell using a self supporting composite cathode in accordance with one aspect of the invention.

Process steps to fabricate a hybrid lithium ion cell using a self supporting composite cathode and a buffer layer are illustrated generally in FIG. 7. Beginning with a self supporting cathode 3 (top) made according to the process shown in FIG. 2, a buffer layer 8 (e.g., $LiNbO_3$) described in Example 6 is deposited as previously described on the cathode. A solid state electrolyte 4 [for example, $Li_yAl_{(1-x)}Ga_xS(PO_4)$] is deposited on top of the buffer layer by VPSPEED or other suitable process. A lithium foil anode and current collector 5 is then placed on top of the electrolyte with or without polymer separator. Finally, the assembly is placed in a pouch 12, which is filled with liquid electrolyte 11 (for example, a $LiPF_6$ solution) and sealed to form the completed Li cell (bottom). The liquid electrolyte further enhances the lithium ion conduction among all components of the cell.

EXAMPLE 8

Figure 7B:
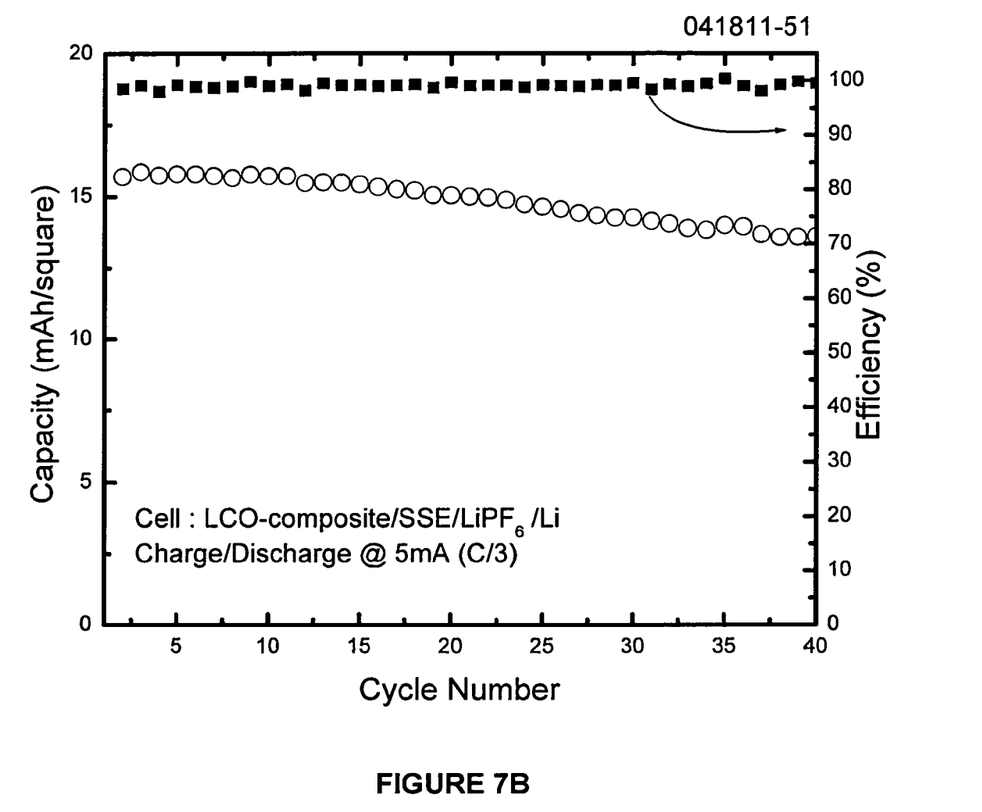
FIG. 7B illustrates the discharge capacity of the cell of FIG. 7A having self supporting $LiCoO_2$:Al composite as the cathode and Li foil as the anode.

The formation of a hybrid $LiCoO_2$:Al cell with a buffer layer construct is same as that of EXAMPLE 6, except that the assembly is placed in a pouch filled with liquid electrolyte. The liquid electrolyte is a 1.5M solution of $LiPF_6$ in 1:1 ethylene carbonate/propylene carbonate solvent. The discharge capacity of the cell, about 15 mAh/cm$^2$ at C/3, is shown in FIG. 7B. This shows minimum fade after about 40 cycles. The columbic efficiency of the cell is excellent at about 100%.

Figure 8:
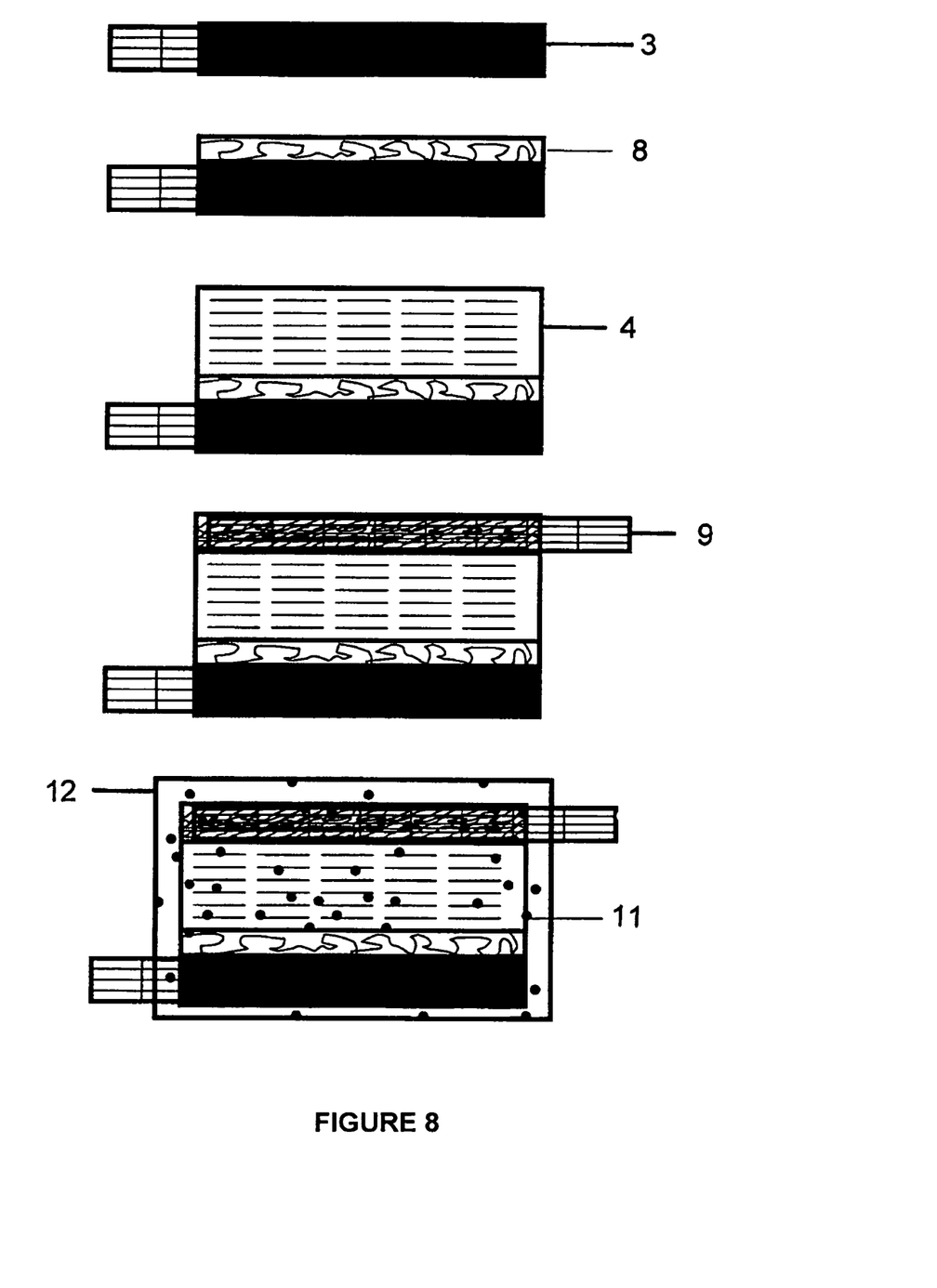
FIG. 8 illustrates the steps for fabricating a hybrid cell using self supporting composite anode and cathode with a buffer layer in accordance with another aspect of the invention.

Process steps to fabricate a hybrid lithium ion cell using a self supporting composite cathode and anode, and a buffer layer, are illustrated generally in FIG. 8. Beginning with a self supporting cathode 3 (top) made according to the process shown in FIG. 2, a buffer layer 8 (e.g., LiNbO$_3$) is deposited as previously described on the cathode. A solid state electrolyte 4 [for example, Li$_y$Al$_{(1-x)}$Ga$_x$S(PO$_4$)] is deposited on top of the buffer layer by VPSPEED or other suitable process. A self supporting composite anode 9 is then placed on top of the electrolyte with or without polymer separator. Finally, the assembly is placed in a pouch 12, which is filled with liquid electrolyte 11 (for example, a LiPF$_6$ solution) and sealed to form the completed Li cell. Again the liquid electrolyte enhances the lithium ion conduction among all components of the cell.

EXAMPLE 9

The formation of a hybrid LiCoO$_2$:Al solid cell with a buffer layer construct is same as that of EXAMPLE 8, except that the lithium foil anode is replaced by the self supporting SnO anode of EXAMPLE 3.

It will be further appreciated that the inventive process yields a novel structure that exhibits many superior characteristics that make it desirable for use in various battery designs. For example, the composite structures described by Wang et al. [Journal of Power Sources 196:8714-18 (2011)] used metal foam but were not calendared because, presumably, it was considered desirable to have a substantially porous electrode structure that could be infiltrated by liquid electrolyte in order to improve the kinetics of charging and discharging. However, the structure ultimately showed a somewhat limited lifetime. The inventive, calendared electrode, despite its relatively high density, surprisingly shows excellent ionic conductivity, which is provided mostly by the inorganic binder and lithium ion conducting nanoparticle additives.

Some exemplary physical characteristics of the inventive electrode include the following: The completed cathode preferably has 5 to 25% of its volume occupied by the metal foam and 75 to 95% by the electrode active materials and other additives. Final density is preferably between 2 and 6 g/cm$^3$. Porosity is typically between 5 and 30%. The metal is preferably Ni but may alternatively be any suitable metallic conductor, such as Al, Cu, Fe, stainless steel, etc. Although in many of the examples constructed, the substrate was metal foam having interconnected porosity, it will be appreciated that a woven or other porous fibrous metal such as steel wool may also be suitable for some applications.

Some unique attributes of the inventive structure include the following:
a. A self supporting dense cathode can be interchangeably used to fabricate inorganic solid state cells or liquid cells.
b. Ionic conductivity is provided mostly by the inorganic binder, and other inorganic ion conducting additives instead of liquid electrolyte residing in the pores of less dense traditional cathodes that have insulative organic binders.
c. Electronic conductivity is provided by a reticulated metallic wire mesh, metal wool, or metal foam and preferably inorganic electron conducting additives. The reticulated metallic phase further serves as a mechanical reinforcement for the structure.
d. The cathode thickness is typically in the range of 100 μm to 500 μm.
e. The cathode may have an inorganic solid state electrolyte or a bilayer of lithium ion conducting buffer and inorganic solid state electrolyte deposited on it.
f. The latter structure when used in a liquid cell blocks the formation of any solid-electrolyte-interface layer; this creates a cell with long cycle life and no self discharge.
g. The structure, when used in a solid state cell, can deliver energy in the mA/cm$^2$ range compared to values in the μA/cm$^2$ range commonly observed in traditional inorganic solid state cells.
h. The anodes of the inventive cells may be either an inorganic solid state electrolyte protected Li anode or another composite self supporting anode.
i. The inventive composite structure shows no Li dendrite formation and all materials making up the cell are inorganic with very high melting temperature, hence, the cells are very safe.

It will be appreciated by those skilled in the art that many variations and combinations may be constructed using the methods described in the foregoing Examples, which are provided for illustrative purposes and are not intended to limit the scope of the invention as defined by the claims that follow.

I claim:
1. An anode for a lithium ion battery comprising:
a first phase comprising a lithium ion storage material;
a second phase comprising a solid state lithium ion conductor, wherein said second phase is deposited on said lithium ion storage material; and
a third phase comprising a reticulated metal structure, interspersed throughout said first and second phases, said reticulated metal forming a structural reinforcement and a current collector,
wherein said metal structure comprises from 5 to 25% of the volume of material,
said first and second phases together comprise from 75 to 95% of the volume of the material, and
said anode contains from 5 to 30 vol. % porosity.
2. The anode of claim 1, wherein said first phase comprises at least one compound selected from the group consisting of: Li$_4$Ti$_5$O$_{12}$.
3. The anode of claim 1 wherein said solid state lithium ion conductor comprises a material selected from the group consisting of: Li$_2$WO$_4$, and Li$_{7-x}$La$_3$(Zr$_{2-x}$Nb$_x$)O$_{12}$, wherein x is from 0 to 2.
4. The anode of claim 1 further comprising dispersed electronically conductive particulates selected from the group consisting of: Ti$_4$O$_7$, carbon nanotube, carbon nanowire, carbon nano-particles, semiconductor nanowire, semiconductor nano-particles, metal nanowire, metal nano-particles and ceramic nanoparticles.
5. The anode of claim 1 wherein said reticulated metal structure comprises metal foam selected from the group consisting of: Ni and Ni alloys, stainless steel, Cu and Cu alloys, Al and Al alloys.
6. A lithium ion battery comprising:
an anode comprising:
a first phase comprising a lithium ion storage material;
a second phase comprising a solid state lithium ion conductor, wherein the second phase is deposited on said lithium ion storage material; and
a third phase comprising a reticulated metal structure, interspersed throughout said first and second phases, said reticulated metal forming a structural reinforcement and a current collector,
wherein said metal structure comprises from 5 to 25% of the volume of material,
said first and second phases together comprise from 75 to 95% of the volume of the material, and said anode contains no more than 30 vol.% porosity;

a cathode comprising an energy storage material;

a lithium-conducting electrolyte separating said cathode from said anode; and further comprising a buffer layer selected from the group consisting of: $LiNbO_3$, $Li$-$\beta Al_2O_3$, $Li_{1.3}Al_{0.3}Ti_{1.7}(PO_4)_3$, $Li_{7-x}La_3(Zr_{2-x}Nb_x)O_{12}$, $Li_{0.35}La_{0.55}TiO_3$, and $LiTi_2(PO_4)_3$; wherein x is from 0 to 2.

7. The lithium ion battery of claim 6 wherein said lithium ion storage material comprises at least one compound selected from the group consisting of: $Li_4Ti_5O_{12}$.

8. The lithium ion battery of claim 6 wherein said reticulated metal structure comprises metal foam selected from the group consisting of: Ni and Ni alloys, stainless steel, Cu and Cu alloys, Al and Al alloys.

9. The lithium ion battery of claim 6 wherein said solid state lithium ion conductor comprises a material selected from the group consisting of: $Li_2WO_4$, and $Li_{7-x}La_3(Zr_{2-x}Nb_x)O_{12}$; wherein x is from 0 to 2.

10. The lithium ion battery of claim 6 wherein said lithium conducting electrolyte comprises a liquid $LiPF_6$ solution.

11. The lithium ion battery of claim 6 wherein the buffer is $Li_{7-x}La_3(Zr_{2-x}Nb_x)O_{12}$; wherein x is from 0 to 2.

12. The lithium ion battery of claim 6 wherein said anode contains from 5 to 30 vol. % porosity.

13. The anode of claim 3 wherein said solid state lithium ion conductor material comprises $Li_7La_3Zr_2O_{12}$.

14. The lithium ion battery of claim 9 wherein said solid state lithium ion conductor material comprises $Li_7La_3Zr_2O_{12}$.

15. The anode of claim 1 wherein said second phase comprises $(Li_{0.35}La_{0.55})TiO_3$.

16. The lithium ion battery of claim 6 wherein said second phase comprises $(Li_{0.35}La_{0.55})TiO_3$.

* * * * *